US007789084B2

(12) United States Patent
Rittner et al.

(10) Patent No.: US 7,789,084 B2
(45) Date of Patent: Sep. 7, 2010

(54) METHOD FOR EQUIPPING A PERSONAL SERVICE UNIT WITH PASSENGER OXYGEN MASKS

(75) Inventors: Wolfgang Rittner, Siblin (DE); Ruediger Meckes, Berkenthin (DE); Wolfgang Marquardt, Snohomish, WA (US); Hasso Weinmann, Luebeck (DE)

(73) Assignee: DAe Systems GmbH, Lübeck (DE)

( * ) Notice: Subject to any disclaimer, the term of this patent is extended or adjusted under 35 U.S.C. 154(b) by 997 days.

(21) Appl. No.: 11/533,074

(22) Filed: Sep. 19, 2006

(65) Prior Publication Data
US 2007/0066132 A1    Mar. 22, 2007

(30) Foreign Application Priority Data
Sep. 19, 2005    (DE) .................... 10-2005-044719

(51) Int. Cl.
*A61M 11/00*    (2006.01)
(52) U.S. Cl. ............................. 128/204.18; 244/118.5
(58) Field of Classification Search ............ 128/200.24, 128/201.29, 202.11, 0.19, 204.18, 0.21–0.23, 128/0.26, 0.29, 205.11, 0.25, 206.21, 207.13; 244/118.5
See application file for complete search history.

(56) References Cited
U.S. PATENT DOCUMENTS

| 4,909,247 | A | * | 3/1990 | Terrisse et al. ......... 128/206.27 |
| 5,419,450 | A |   | 5/1995 | Guglielmelli et al. |
| 5,803,062 | A | * | 9/1998 | Aulgur ................. 128/202.26 |
| 5,816,244 | A | * | 10/1998 | Aulgur ................. 128/206.27 |
| 6,089,230 | A | * | 7/2000 | Barker et al. ........... 128/204.29 |
| 6,318,364 | B1 |  | 11/2001 | Ford et al. |

FOREIGN PATENT DOCUMENTS

| WO | WO 97/43179 | 11/1997 |
| WO | WO 2006/088581 | 8/2006 |

* cited by examiner

*Primary Examiner*—Steven O Douglas
(74) *Attorney, Agent, or Firm*—McGlew and Tuttle, P.C.

(57) ABSTRACT

A method for equipping a personal service unit with passenger oxygen masks includes arranging one or more passenger oxygen masks in an intermediate container ready for use, and then attaching the intermediate container together with the masks located therein within the personal service unit. In this manner, the comparatively lengthy packaging procedure which is difficult to carry out in overhead work, may be effected in a simplified and reproducible manner outside the aircraft.

20 Claims, 2 Drawing Sheets

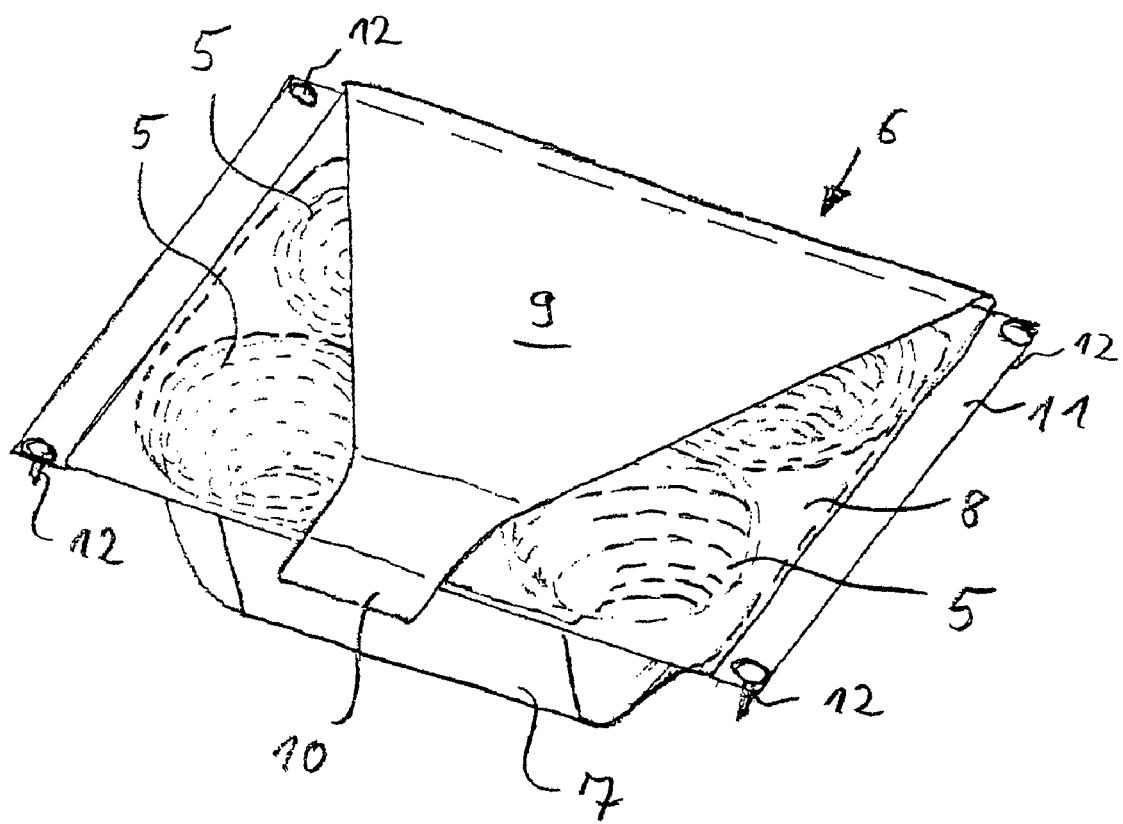

METHOD FOR EQUIPPING A PERSONAL SERVICE UNIT WITH PASSENGER OXYGEN MASKS

CROSS REFERENCE TO RELATED APPLICATIONS

This application claims the benefit of priority under 35 U.S.C. §119 of German Patent Application DE 10 2005 044 719.8-22 filed Sep. 19, 2005, the entire contents of which are incorporated herein by reference.

FIELD OF THE INVENTION

The invention relates to a method for equipping a personal service unit with passenger oxygen masks, as well as an inventive intermediate receptacle for implementing this method.

BACKGROUND OF THE INVENTION

Typically, a personal service unit is arranged above the seating rows in passenger aircraft, in which, apart from lighting and ventilation, in particular passenger oxygen masks are also arranged, which fall downwards in order to be within the reach of the passengers in the case of a pressure drop within the cabin. For this, a compartment or container which may be closed with a flap arranged on the lower side is provided in the personal service unit, in which typically four or more passenger oxygen masks are arranged, depending on the number of seats located therebelow.

The masks always have an emergency oxygen supply flexible tube, via which they are connected to the respective stationary oxygen connection in the personal service unit. Furthermore, the masks typically yet comprise a storage bag as well as, where appropriate, an activation cord. These components are to be stored within the container in a defined arrangement, i.e. the flexible tube of each passenger oxygen mask is to be connected and rolled up in a predefined manner, and the passenger oxygen mask is then to be arranged such that it falls freely downwards on opening the flap. Thereby, the arrangement is to be effected such that the valves located in the mask are not loaded, so that they may carry out their function on later application. The ready-to-use installation of these passenger oxygen masks is therefore quite complicated in practice and in particular may not be carried out in a simple manner on account of the overhead work.

Added to this is the fact that these activities not only occur with the first installation into the aircraft, but also reoccur regularly, since the activation of the masks must be regularly checked for approval and maintenance checks.

SUMMARY OF THE INVENTION

Against this background, it is the object of the invention to provide a method for equipping a personal service unit with oxygen masks, which is less complicated and furthermore ensures a higher reproducibility. Furthermore, the designs with regard to the device which are necessary for this are to be provided.

According to the invention a method is provided for equipping a personal service unit with passenger oxygen masks. The method includes arranging, ready for use, one or more passenger oxygen masks, in an intermediate receptacle and installing the intermediate receptacle into the personal service unit.

According to another aspect of the invention, an intermediate receptacle is provided with one or more passenger oxygen masks arranged therein ready for use. A fastening means is provided for fastening the receptacle in a personal service unit.

The inventive method for equipping a personal service unit with passenger oxygen masks envisages firstly arranging one or more passenger oxygen masks ready for use in an intermediate receptacle, in which these may be stored and transported as the case may be. The intermediate receptacle with the passenger oxygen masks arranged therein ready for use, is installed into the personal service unit.

The basic concept of the present invention is to considerably simplify the installation of the passenger oxygen masks and to improve this with regard to its reproducibility, in that these passenger oxygen masks are not installed on-site in the aircraft in an overhead manner as was previously the case. Instead, according to the invention the passenger oxygen masks are installed in an intermediate receptacle. The arrangement of the passenger oxygen masks with the associated components such as a flexible tube, a storage bag, etc. in the intermediate receptacle may be effected on the part of the factory under controlled conditions, and in an ergonomically favorable position in the previously described manner, whereas the actual installation into the personal service unit of the aircraft may be effected in that the complete intermediate receptacle is installed into the personal service unit, wherein the intermediate receptacle with regard to connection is usefully designed such that only a few handling procedures are sufficient in order to ensure a correct connection of all masks.

The method according to the invention not only has the advantage that the arrangement of the passenger oxygen masks within the intermediate receptacle may be effected significantly more quickly, more accurately and in a better reproducible manner than on-site within the aircraft. A further significant advantage is to be seen more in the fact that the equipping times within the aircraft, thus the time in which the aircraft is necessarily not operationally ready due to the installation of the masks, may be significantly reduced, since specifically in the case of an activation test of the masks, only the intermediate receptacles with the masks suspended thereon are removed and replaced by finished packed intermediate receptacles, which may be effected with few handling procedures. Furthermore, the process of arranging the masks within the intermediate receptacle within a factory may be controlled and reproduced in a significantly better manner than this could be done previously within the aircraft, by which means the operationally reliability is further increased.

Usefully, the intermediate receptacle is closed after the arrangement of the passenger oxygen masks, wherein a cover closing the intermediate receptacle is removed after the installation of the receptacle into the personal service unit, and then replaced by the respective cover (flap) of the personal service unit.

The closure of the intermediate receptacle has the advantage that the passenger oxygen masks are practically completely closed within the intermediate receptacle during the transport and storage, and thus are protected from dust and other environmental influences by way of this. The correct condition is then created by way of the removal of the cover after installation, thus directly before closure of the flap of the personal service unit.

It is basically necessary for the oxygen supply between the passenger oxygen masks and the oxygen connection in the personal service unit to be created before the installation of the intermediate receptacle into the personal service unit. This may be effected for example by way of sticking on one or more flexible tubes. It is however particularly advantageous if this is effected quasi automatically on installation of the intermediate receptacle into the personal service unit, if specifically a suitable conduit connection is provided, so that the conduit connection is created by way of simply sticking on the intermediate receptacle into the space in the personal service unit envisaged for this.

Usefully, a connection between the receptacle and the personal service unit is formed on installation of the intermediate receptacle into the personal service unit. This for example may be effected in that the intermediate receptacle in its shape itself is designed such that it locks in the corresponding receiving space in the personal service unit after insertion or however for example by way of locking pins or other positive-fit, non-positive fit or material fit elements which on the one hand may be released again and on the other hand may be assembled reliably and quickly without tools where possible. Corresponding fastening systems have been known sufficiently. The arrangement of a Velcro®-type (hook and loop fastener) connection between the intermediate receptacle and the corresponding space of the personal service unit is also conceivable.

A suitably designed intermediate receptacle is required for the equipping method according to the invention. Accordingly, the invention envisages an intermediate receptacle with one or more passenger oxygen masks arranged therein ready for use, which furthermore comprises means for fastening the receptacle in the personal service unit. Advantageously, the intermediate receptacle is provided with a closing cover, in order to protect the passenger oxygen masks which are arranged therein ready for use, from external influences such as dust and likewise.

The intermediate receptacle may be designed in a particularly inexpensive and effective manner, if this is designed as a blister package according to a further formation of the invention.

Each passenger oxygen mask comprises a flexible tube for the emergency oxygen supply. The free end of each flexible tube arranged in such an intermediate receptacle is either led directly through the wall of the intermediate receptacle, preferably on the rear side, thus on the side distant to the cover, or however is connected to a distributor piece which is arranged within the intermediate receptacle and which in turn comprises a central supply flexible tube which is then led through this rearward wall of the intermediate receptacle.

What is more favorable with regard to the assembly is an embodiment variant with which within the intermediate receptacle, depending on the number of masks to be accommodated, one or more connections for a flexible tube of a passenger oxygen mask are provided, so that the flexible tube connections between the passenger oxygen masks and the intermediate receptacle may be effected at the same time as the packaging, whereas then only one connection be it in the form of a flexible tube or also of a coupling as part of a conduit connection is to be led out of the intermediate receptacle, which then is to be coupled to the respective conduit connection for the emergency oxygen supply in the personal service unit.

The intermediate receptacle is advantageously designed such that it may be fastened within the corresponding free space in the personal service unit with few handling procedures. This may also be effected by way of a Velcro®-type (hook and loop fastener) connection between the parts to be fastened to one another. A connection may likewise be formed by way of a suitable shaping between the intermediate receptacle on the one hand and the opening within the personal service unit, for example in a manner such that the receptacle may be introduced into the corresponding recess in the manner of a locking connection. This may however also be effected in a simpler form by way of fastening pins, which for example are led through a flange of the intermediate receptacle provided near the cover, and firmly held within a corresponding recess in the personal service unit. Such pins may be provided with a wide bearing face, so that they may be introduced by hand without a tool.

According to a further aspect of the invention, the cover closing the intermediate receptacle may advantageously be designed as a tamper-evident closure so that one may recognize at a glance whether the intermediate receptacle is in the originally packaged condition or not. The projecting tab is advantageously provided with a warning note as a distinctly recognizable viewing strip, so that it may be immediately recognized that it is the case here of the tab which must be pulled out for the activation of the device. Usefully, the cover comprises a projecting tab so that the intermediate receptacle with the passenger oxygen masks arranged therein may firstly be installed into the corresponding free space in the personal service unit and connected by conduit, wherein then the flap usually located on the lower side is almost closed, so that only the protruding tab of the cover projects, on which one pulls until the complete cover has been released from the intermediate receptacle and removed through the existing gap. Thereafter, the cover of the personal service unit is closed and thus the intermediate receptacle including the passenger oxygen masks located therein is conveyed into the correct position in a manner such with a later case activation, the passenger oxygen masks fall out downwards, suspended from the respective flexible tube, after the opening of the flap.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 in a perspective view, a blister package with four passenger oxygen masks arranged therein ready for use.

DETAILED DESCRIPTION OF THE PREFERRED EMBODIMENTS

Figure 1:
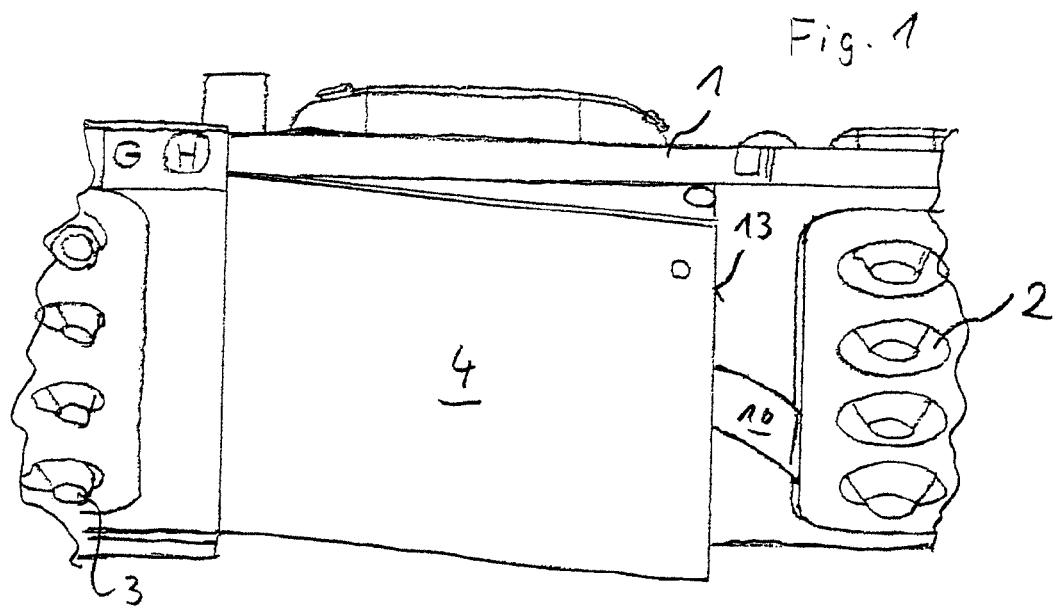
FIG. 1 is a greatly simplified perspective representation from below showing a part of a personal service unit with a partly opened flap.

Referring to the drawings in particular, a personal service unit 1 is shown extending in the known manner over the seat rows in the aircraft. The personal service unit 1, comprises lighting 2 for the passengers seated therebelow, ventilation exits 3 as well as a flap 4 which closes a space lying thereabove. The space accommodates four passenger oxygen masks 5. The passenger oxygen masks 5 in the known manner are connected to a flexible tube, which via a distributor piece is connected to a central emergency oxygen supply connection within the personal service unit 1. The passenger oxygen masks 5 further comprise a storage bag which is likewise accommodated there.

Whereas with the state of the art, the mentioned components are arranged directly in the space for this formed by the personal service unit 1, with the represented embodiment example, four passenger oxygen masks 5 lie arranged next to one another in a blister packaging 6. The blister packaging 6 consists essentially of a receptacle 7 corresponding in dimensions and shape roughly to the space in the personal service unit and which on its upper side (lower side in the installed position) is closed by a cover 8 in the form of a plastic film. The plastic film of cover 8, as is common with blister packages, is welded onto a peripheral, flange-like edge 11 of the receptacle 7. The cover 8 furthermore comprises a tab 9 which at the end of the receptacle 7 is bent by 180°, covers the receptacle 7 once again on its upper side and projects beyond the receptacle 7 at its free end.

The receptacle 7 on the rear side comprises a flexible tube conduit which is not shown and which is led through the receptacle rear wall and which within the receptacle 7 connects to the free ends of the flexible tubes of the passenger oxygen masks 5 arranged there by way of a distributor.

The previously described, blister package 6 equipped with passenger oxygen masks 5 ready for use is packed on the part of the factory and connected by conduit in the previously described manner. For the connection of the passenger oxygen masks 5 within the personal service unit 1, with the flap 4 opened, firstly the free end of the flexible tube led out of the blister package 6 at the rear side is once fastened on the connection piece provided accordingly for this within the personal service unit 1, whereupon the blister package 6 with the cover 8 directed downwards, is inserted into the corresponding opening in the personal service unit 1, the opening lying behind the flap 4.

Locking pins 12 are arranged in corresponding recesses in the flange-like edge 11 of the blister package 6. These locking pins 12 are introduced into corresponding locking recesses provided within the personal service unit, by way of simply pressing in, whereupon after fastening all four locking pins 12, the blister package 6 is mechanically firmly arranged within the personal service unit 1 and the passenger oxygen masks 5 located therein are connected to the emergency oxygen supply system of the aircraft. Thereby, the masks 5 are held in their position by the cover 8.

Figure 2:
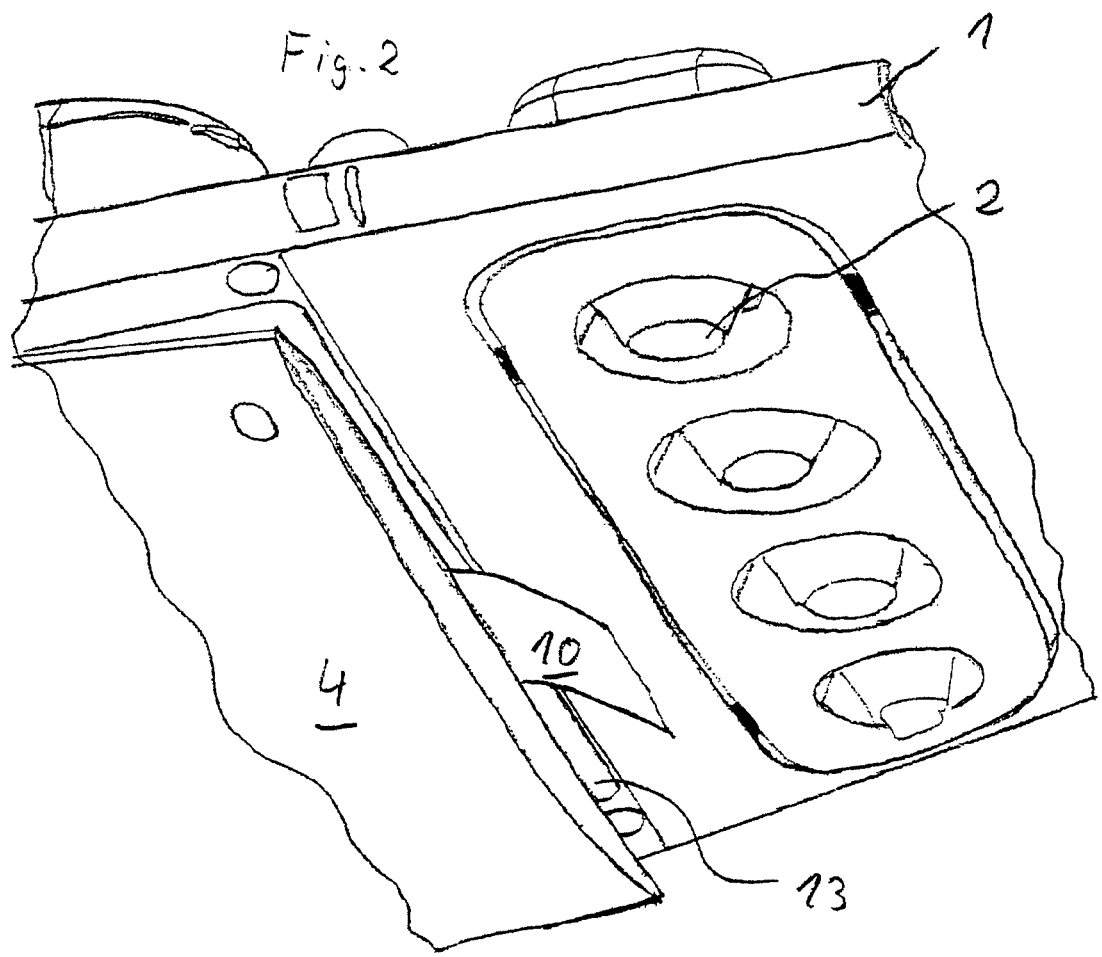
FIG. 2 is an enlarged representation showing the slot formed by the partly opened flap with a tab led out.

The cover 8 must however be removed, so that with a later application after opening the flap 4, the masks may fall out downwards in the known manner suspended on the respective flexible tube. In order to remove the cover 8, the flap 4 as represented in FIGS. 1 and 2 is pivoted until almost in its closed position, so that only a narrow slot 13 remains, through which the free end 10 of the tap 9 then projects. By way of a suitable pulling on the free end 10 on the tab 9, the cover 8 is then pulled away from the edge 11, so that when the cover 8 has been completely removed through the slot 13, the flap 4 may be closed, whereupon the passenger oxygen masks 5 are arranged ready for use in their correct position.

If, after activation of the flaps 4 (e.g. for test purposes), the passenger oxygen masks 5 have fallen out, by way of releasing the locking pins 12, the receptacle 7 together with the passenger oxygen masks 5 suspended thereon on the flexible tube, is removed from the personal service unit 1 and given to the manufacturer or a suitable service company which then inspect these and, as the case may be, pack them again into blister packages 6 ready for use. In the meanwhile, the personal service unit 1 is equipped with passenger oxygen masks 5 already located in blister packages 6 in the previously described manner, which may be effected in a comparatively short time, whereupon the aircraft is ready for use again.

The method may be further simplified by way of providing a central conduit connection on the rear side of the blister package 6, which may be inserted into a corresponding counter connection within the personal service unit 1, so that the complete assembly may be limited to a single insert procedure.

Usefully, a suitable information note is incorporated on the tab 9 which indicates that this is to be removed. Since the tab 9 with its end 10 protrudes outwards over the edge 11, this itself is visible with the flap 4 closed even if the removal of the cover 8 has been forgotten by mistake. Thus without further ado and by way of a simple visual control, one may control as to whether a correct activation is effected by way of removal of the cover 8. It is to be understood that the recess within the personal service unit 1 for the receptacle 7 is designed such that only one unambiguous positional arrangement is possible, so that the tab 9 also always protrudes on the correct side.

Furthermore, the tab 9 which is still present on the receptacle 7 indicates to the user before the installation, that it is the case of a unit ready for use, and not one which is in need of (awaiting) repackaging.

While specific embodiments of the invention have been shown and described in detail to illustrate the application of the principles of the invention, it will be understood that the invention may be embodied otherwise without departing from such principles.

LIST OF REFERENCE NUMERALS

1 personal service unit
2 lighting
3 ventilation exit
4 flap
5 passenger oxygen mask
6 blister package
7 receptacle
8 cover
9 tab
10 free end of the tab
11 edge of the receptacle
12 locking pins
13 slot

What is claimed is:

1. A method for equipping a personal service unit with passenger oxygen masks, the method comprising:
   arranging a passenger oxygen mask in a ready for use state in an intermediate receptacle;
   installing the intermediate receptacle with arranged oxygen mask into the personal service unit;
   closing the intermediate receptacle with a cover after arranging the passenger oxygen mask in said intermediate receptacle;
   removing said cover after installing said intermediate receptacle with arranged oxygen mask into the personal service unit; and
   providing a personal service unit cover and replacing said cover with said personal service unit cover such that said personal service unit cover closes said intermediate receptacle.

2. A method according to claim 1, wherein upon installation of the intermediate receptacle into the personal service unit a conduit connection between an oxygen connection in the personal service unit and the passenger oxygen masks is created.

3. A method according to claim 1, wherein a mechanical connection between the personal service unit and the intermediate receptacle is formed upon installation of the intermediate receptacle into the personal service unit.

4. An aircraft personal service unit intermediate receptacle, comprising:
an intermediate receptacle;
an oxygen mask arranged ready for use in said intermediate receptacle;
fastening means connected to said intermediate receptacle for fastening said intermediate receptacle in a personal service unit; and
an intermediate receptacle closing cover, said intermediate receptacle and said closing cover comprising a blister package.

5. An intermediate receptacle according to claim 4, further comprising a flexible tube for the emergency oxygen supply to the oxygen mask, said flexible tube being allocated to the passenger oxygen mask wherein a free end of said flexible tube is one of:
led through a wall of said intermediate receptacle at a side and spaced away from said cover or;
is connected to a distributor piece having a central supply flexible tube led through a wall of the intermediate receptacle at a location spaced from said cover.

6. An intermediate receptacle according to claim 4, further comprising a flexible tube for the emergency oxygen supply to the oxygen mask, said flexible tube being allocated to the passenger oxygen mask and one or more connections for said flexible tube within said intermediate receptacle and with at least one connection leading out of said intermediate receptacle, for connection to a conduit connection for the emergency oxygen supply in the personal service unit.

7. An intermediate receptacle according to claim 4, wherein said fastening means comprises fastening pins for fastening the intermediate receptacle in the personal service unit.

8. An intermediate receptacle according to claim 4, wherein said cover comprises a tamper-evident closure.

9. An intermediate receptacle according to claim 4, wherein said cover includes a protruding tab for protruding from said personal service unit in a manner such that after the installation of said intermediate receptacle into the personal service unit and prior to a closure of a cover of the personal service unit, the intermediate receptacle cover may be removed via said protruding tab.

10. An aircraft personal service unit system comprising:
a personal service unit with a receiving space;
an intermediate receptacle;
a passenger oxygen mask in a ready for use state in said intermediate receptacle, said intermediate receptacle with arranged oxygen mask being arranged in said personal service unit;
an intermediate receptacle cover detachably connected to said intermediate receptacle, said intermediate receptacle cover closing said intermediate receptacle with said intermediate receptacle connected to said personal service unit;
a personal service unit cover pivotably connected to said personal service unit such that said personal service unit cover pivots between at least an open position and a closed position, said personal service unit cover closing said intermediate receptacle in said closed position, wherein said intermediate cover is not located within said personal service unit with said personal service unit cover in said closed position.

11. An aircraft personal service unit system according to claim 10, wherein the cover is removed after the intermediate receptacle with arranged oxygen mask is received in the receiving space.

12. An aircraft personal service unit system according to claim 11, wherein said intermediate receptacle and said closing cover comprise a blister package.

13. An aircraft personal service unit system according to claim 10, wherein a conduit connection is arranged between an oxygen connection in the personal service unit and the passenger oxygen mask.

14. An aircraft personal service unit system according to claim 10, further comprising a mechanical connection between said personal service unit and said intermediate receptacle formed upon installation of the intermediate receptacle into the personal service unit.

15. An aircraft personal service unit system according to claim 10, further comprising fastening means connected to said intermediate receptacle for fastening said intermediate receptacle in a personal service unit.

16. An aircraft personal service unit system according to claim 15, wherein said fastening means comprises fastening pins for fastening the intermediate receptacle unit in the personal service unit.

17. An aircraft personal service unit system according to claim 11, wherein said cover includes a protruding tab for protruding from said personal service unit in a manner such that after the installation of said intermediate receptacle into the personal service unit and prior to a closure of a cover of the personal service unit, the intermediate receptacle cover may be removed via said protruding tab.

18. A method according to claim 1, wherein said cover comprises a protruding tab portion, said personal service cover and at least another portion of said personal service unit defining a space with said personal service cover in an open position, said personal service cover having an edge surface, said protruding tab portion extending through said space to a position located at a spaced location from said edge surface of said personal service cover, wherein said cover is removed from said personal service unit via said protruding tab portion such that said cover passes through said space to a position located outside of said personal service unit.

19. An aircraft personal service unit system according to claim 10, wherein said personal service unit cover and at least another portion of said personal service unit define a recess with said personal service unit cover in said open position, said intermediate receptacle cover comprising a protruding tab portion, said protruding tab portion extending through said recess with said personal service unit cover in said open position, said intermediate receptacle cover being detached from said intermediate receptacle via said protruding tab portion with said personal service unit cover in said open position such that said intermediate receptacle cover passes through said recess to a position outside of said personal service unit.

20. An intermediate receptacle according to claim 4, further comprising:
a personal service unit cover pivotably connected to said personal service unit such that said personal service unit cover pivots between at least an open position and a closed position, said personal service unit cover and at least another portion of said personal service unit defining a recess in said open position, said intermediate receptacle cover comprising a protruding tab portion, said protruding tab portion extending through said recess with said personal service unit cover in said open position, said intermediate receptacle cover closing said intermediate receptacle with said intermediate receptacle connected to said personal service unit, wherein said intermediate cover is not located within said personal service unit with said personal service unit cover in said closed position, said personal service unit cover closing said intermediate receptacle in said closed position, said personal service unit cover being located opposite said oxygen mask in said closed position.

* * * * *